United States Patent
Reyzin

[11] Patent Number: 6,064,388
[45] Date of Patent: May 16, 2000

[54] CARTESIAN TO POLAR COORDINATE TRANSFORMATION

[75] Inventor: Igor Reyzin, Brookline, Mass.

[73] Assignee: Cognex Corporation, Natick, Mass.

[21] Appl. No.: 08/967,683

[22] Filed: Nov. 10, 1997

[51] Int. Cl.$^7$ .................................................. G06T 15/00
[52] U.S. Cl. .......................................................... 345/418
[58] Field of Search .................................. 345/418, 419, 345/428

[56] References Cited

U.S. PATENT DOCUMENTS

| | | | |
|---|---|---|---|
| 4,106,021 | 8/1978 | Katagi | 343/5 SC |
| 4,208,721 | 6/1980 | Eisenberg | 364/731 |
| 4,306,296 | 12/1981 | Blaschke | 364/815 |
| 4,500,972 | 2/1985 | Kuhn et al. | 364/526 |
| 5,483,567 | 1/1996 | Swerdloff | 378/4 |
| 5,519,401 | 5/1996 | Farmer et al. | 342/185 |

OTHER PUBLICATIONS

Cognex Corporation, "Cognex 3000/4000/5000, Programmable Vision Engines, Vision Tools," Revision 7.4, 1996, pp. 431–457.

*Primary Examiner*—Mark R. Powell
*Assistant Examiner*—Cliff N. Vo
*Attorney, Agent, or Firm*—Lappin & Kusmer

[57] ABSTRACT

In an improved Cartesian to polar coordinate transformation, a Cartesian system of discrete data elements is converted to a polar system of discrete data elements. Each Cartesian element is divided into subelements and one of the subelements is designated as the polar system origin. A polar system comprising an intersecting plurality of radial sector lines and a plurality of confocal arcs formed of the subelements is defined about the origin. The lines and arcs define boundaries of polar data elements. The subelements lying within the polar element boundaries are identified and their respective data values are derived from the data values of corresponding Cartesian elements. Polar element data values are calculated based on the data values of the subelements contributing to the polar element. The present transformation technique offers the advantage of few floating point operations and provides a computationally efficient conversion system readily adaptive to changes in system parameters.

23 Claims, 10 Drawing Sheets

CARTESIAN TO POLAR COORDINATE TRANSFORMATION

BACKGROUND OF THE INVENTION

In modern artificial vision systems, images are captured and stored as a two-dimensional array of data elements arranged in Cartesian or rectangular space, indexed by X and Y coordinates. Depending on the system application, when the image data is processed, it can be more computationally efficient to first convert the Cartesian image data to polar image data in terms of radius R and angle θ coordinates. Applications where such a conversion may be appropriate include image processing of objects which are circular in nature, determination of object rotation, or more complex operations such as machine reading and object verification.

In modern data processing systems, a Cartesian to polar transformation involves the creation of a fixed map derived from parameters defining the relationship between the Cartesian and polar systems; each Cartesian coordinate pair (X,Y) in the source image corresponding to a polar coordinate pair (R,θ) in the destination image. The polar system parameters, including the origin location, inner radius, outer radius, angle of scan (start angle, end angle), and degree of resolution, are a function of the size, shape, and orientation of the object, and the desired resolution of the polar image.

Generation of the map can be an inefficient process involving many floating point calculations which can consume seconds of processing time. For example, in some modern machine vision systems, each Cartesian pixel is converted to polar coordinates by determining the distance D from the origin and the angle θ relative to the X axis. To determine the distance D, the following operation is performed on each pixel:

$$D = \text{sqrt}(X*X + Y*Y);$$

to determine the radial angle θ, the following operation is employed:

$$\theta = \arctan(Y/X);$$

where X and Y are the Cartesian coordinates of the pixel. Each of these operations involves complicated floating point calculations, demanding large amounts of processor time. To worsen matters, these inefficient computations are performed on highly iterative portions of the transformation.

Following a determination of the radial coordinates of each pixel, the coordinates are matched to a corresponding predefined polar element, requiring additional floating point arithmetic. These complex operations are performed for each pixel in the Cartesian system. Some advanced techniques increase transformation resolution by first dividing the pixels into subpixels. In these systems the aforementioned floating point operations are performed on each subpixel, geometrically increasing the number of floating point calculations required for creating the map function. For this reason any change in system parameters requiring calculation of a new system map can result in an unacceptable delay. Therefore the system map is predetermined and fixed at runtime, resulting in a system which is inflexible and not readily adaptable to environmental changes, for example changes in the size, location and features of the object being imaged.

SUMMARY OF THE INVENTION

The transformation of the present invention converts a source data array arranged in Cartesian coordinates to a destination data array arranged in polar coordinates in a manner which overcomes the limitations of the prior art. The present invention is well adapted for real-time adjustment of the polar image parameters, including image resolution, which can be made arbitrary. Real-time mapping between coordinate systems is possible by a conversion technique which reduces the number of complex floating point computations, eliminating such calculations in the highly iterative segments of the transformation and sparingly performing such calculations in less iterative segments. A preferred implementation offers the advantage of relatively few floating point operations, increased flexibility, and real-time adaptability to changes in system parameters, thereby providing a flexible and computationally efficient conversion system.

The present invention is directed to an improved method and apparatus for converting a Cartesian coordinate system of discrete data elements to a polar coordinate system of discrete data elements. In each of the coordinate systems, the data elements have corresponding data values. The Cartesian elements are first divided into subelements and one of the subelements is designated as a polar system origin. A polar system is defined about the origin comprising an intersecting plurality of radial sector lines formed of said subelements and a plurality of confocal arcs formed of said subelements. The intersecting lines and arcs define the boundaries of polar elements in the polar system. Subelements which lie within the boundaries of or otherwise contribute to each polar element are identified. For those subelements which contribute to a polar element, the respective subelement data values are derived from the data value of the Cartesian element corresponding to the subelement, in other words from the data value of the Cartesian element from which the subelement was divided. For each polar element, a corresponding polar element data value is calculated based on the data values of the subelements within the boundaries of the polar element. The polar element data values are in turn stored in a destination array.

In a preferred embodiment, each Cartesian element is divided into $2^{2n}$ subelements where n represents the resolution of the conversion. The resolution n may be a non-negative integer selected from the set of integers consisting of (0, 1, 2, 3, ... ). In the case where n is 0 each Cartesian element is divided into a single subelement.

In a preferred embodiment, designation of a polar system origin comprises dividing a Cartesian element into $2^{2n}$ Cartesian subelements and, when $n \geq 1$, designating the subelement having coordinates $(2^{n-1}, 2^{n-1})$ in subelement space as the polar system origin; and when n=0, designating the subelement having coordinates $(2^0, 2^0)$ in subelement space as the polar system origin.

Each polar element is preferably defined by inner and outer arcs and first and second sector lines. The subelements contributing to a polar element preferably include those which correspond to one of the inner and outer arcs and one of the first and second sector lines. For example, the contributing subelements may correspond to those of the outer arc and of the furthest counter-clockwise sector line with respect to the polar system origin. In a preferred embodiment, each subelement is designated to not more than one polar element.

In an efficient implementation, the polar system is divided into symmetrical segments, for example octants. This technique conserves processing time by computing the polar arcs in only a portion of the polar system, for example in one of the segments designated as a working segment. Polar sector lines of remaining octants are mapped to the working segment, and the polar elements are defined in the working segments. Polar element data values are computed by mapping the coordinates for the Cartesian subelements within the polar elements back to the originating octant and referencing its corresponding data value in that octant Polar elements in remaining non-working segments are mapped to the working segment on a column-by-column basis. Octant segmentation is preferred because the mapping of subelement coordinates between octants involves the computationally-efficient operations of reversing the sign of the coordinate and/or transposing the X and Y coordinates.

A computationally efficient conversion technique is provided which recognizes and takes advantage of certain features of the polar system. Efficient arc computation and sector line computation calculations are performed for each set of image data. Highly iterative computations are performed using efficient binary operations. Computationally expensive operations are performed infrequently, for example integer division operations are performed once per polar element, while floating point operations are performed once per polar column or once per input source data array.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
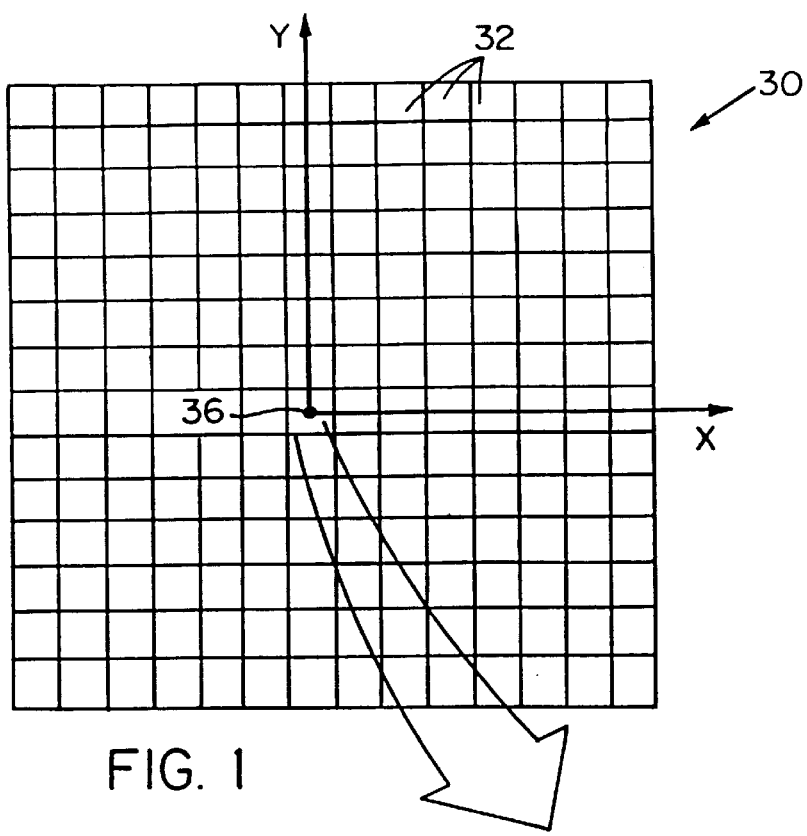
FIG. 1 is an illustration of a source array of data elements represented in Cartesian coordinates, for example a pixel image.
Figure 13A:
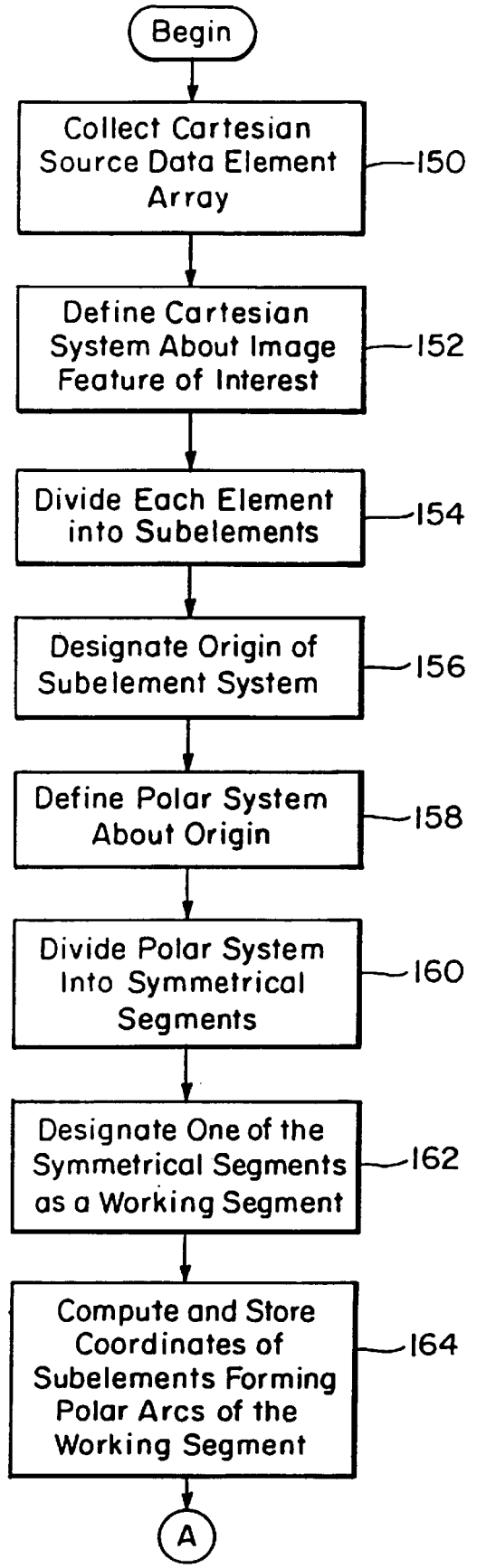
FIGS. 13A and 13B are a flowchart of steps performed for translating Cartesian data to polar data in accordance with a preferred embodiment of the present invention.
Figure 13B:
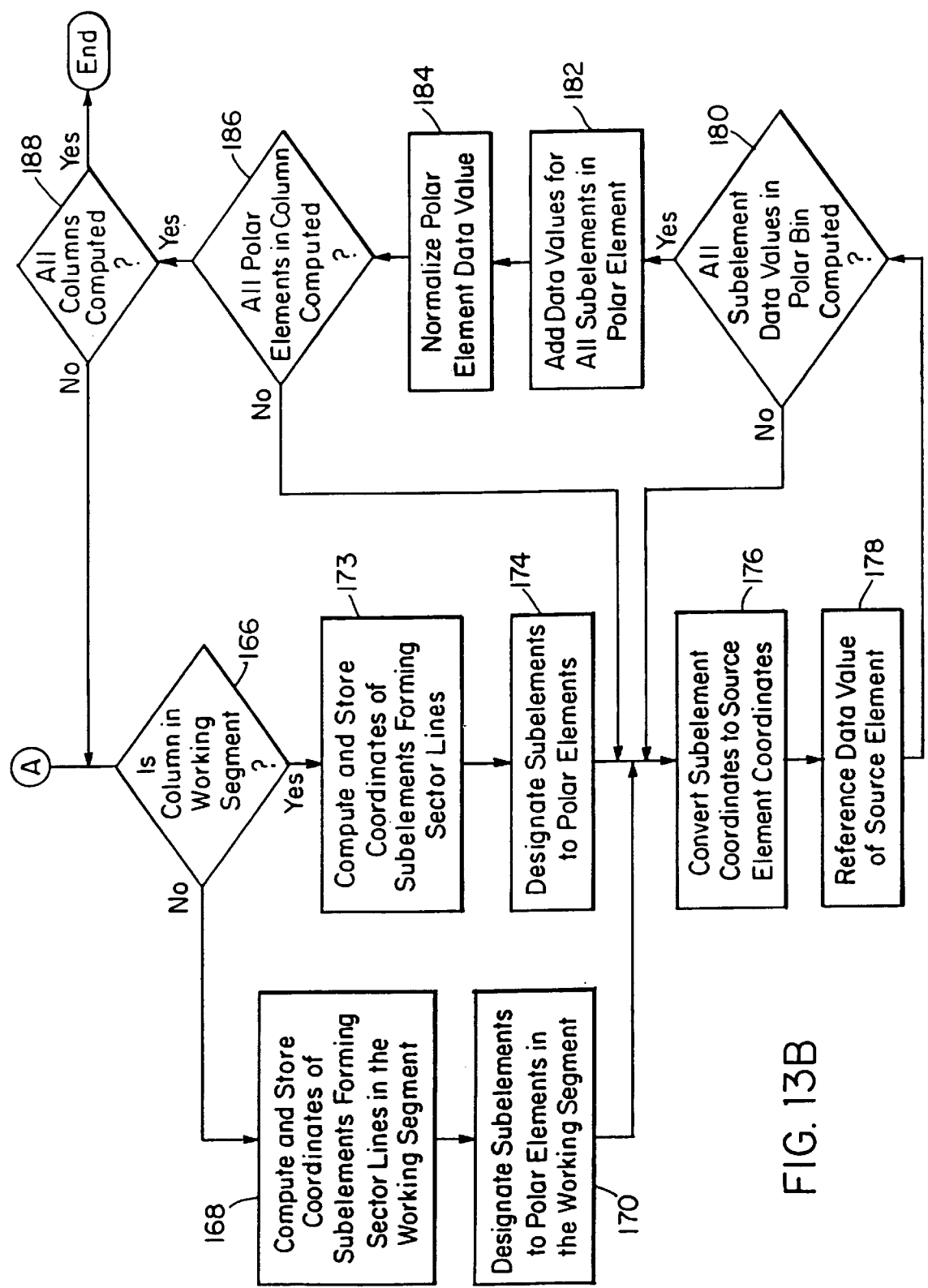

FIG. 1 is an illustration of a two-dimensional data array 30, for example an array of data representing an image as captured by a sensor, for example an image sensing system. The array 30 comprises a plurality of individually addressable elements 32, referred to as pixels in imaging technology. The pixels are commonly square in shape, although it is contemplated that the pixels can have other shapes, for example rectangles and various polygons. A Cartesian system indexed by coordinates X, Y is defined about a designated origin 36. The location of the origin 36 is determined based on the interesting features of the captured image. Each element 32 is indexed by a Cartesian coordinate pair (X,Y), also referred to as a rectangular coordinate pair, each index value X,Y in the pair corresponding to the distance between the pixel and the system origin along the respective array axis. The step of collecting the Cartesian data array is illustrated as step 150 in the transformation flow diagram of FIGS. 13A and 13B. The various remaining steps of the transformation are described below with reference to the flow diagram of FIG. 13.

Note that for purposes of the present invention the term "Cartesian system" refers to a system of rectangular coordinates (X, Y) indexed in terms of distance from an origin with respect to the X and Y normal axes, while the term "polar system" refers to a radial coordinate system indexed in terms of the distance or radius R form an origin and an angle θ relative to an angular axis, frequently the positive X axis of the Cartesian system, in other words, the portion of the X-axis extending from the origin 36 to the right of the origin, as illustrated in the various drawings.

Figure 2:
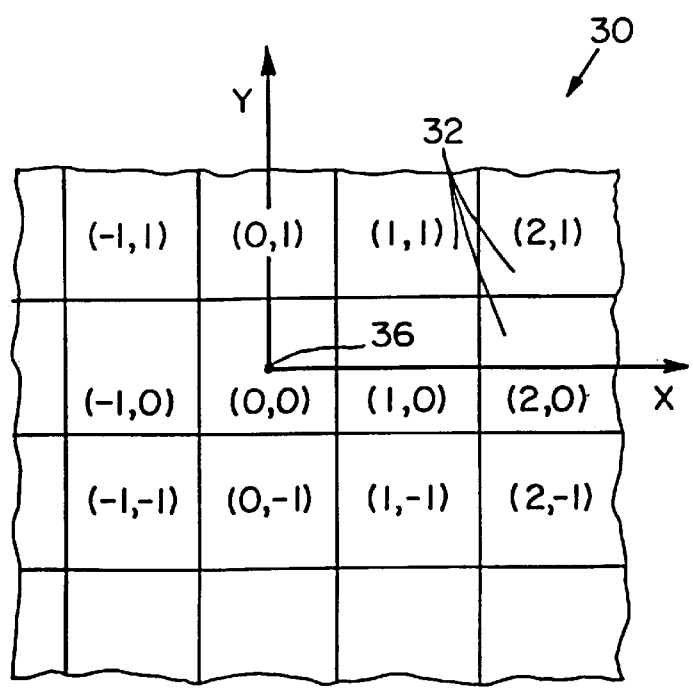
FIG. 2 is a close-up view of a portion of the FIG. 1 source array of data elements and their respective Cartesian coordinates.

FIG. 2 is a closeup illustration of a portion of the array 30 of FIG. 1 in the vicinity of the designated origin 36, corresponding to step 152 in the flow diagram of FIG. 13. The elements 32 are referenced by their Cartesian coordinates, relative to the origin 36. Each element 32 of the image array stores a data value, for example a grey scale image intensity value, corresponding to that pixel. For purposes of the present invention, the array of elements 32 and corresponding data values is referred to herein as a "source array" of elements.

Figure 3:
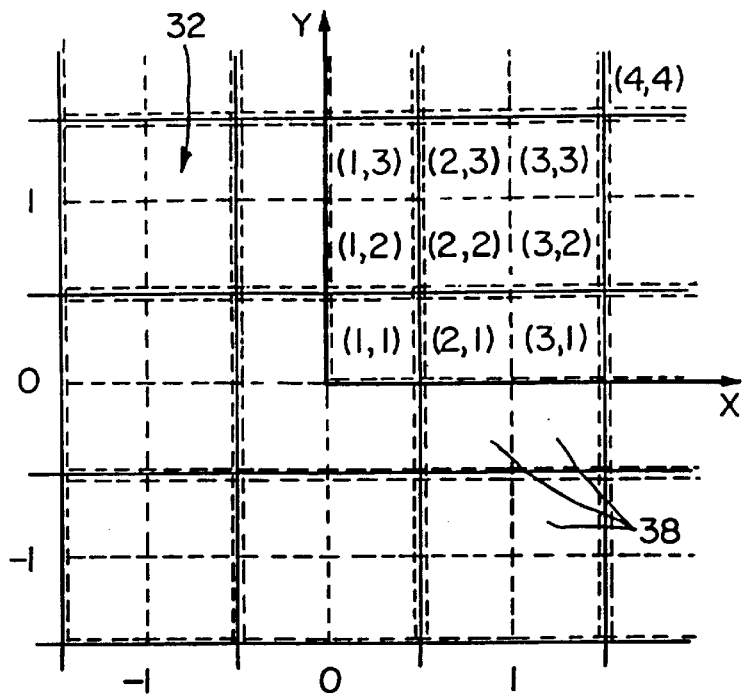
FIG. 3 illustrates the step of dividing each source data element into subelements, in accordance with the present invention.

In a first step of a preferred embodiment of the inventive transformation, as shown in FIG. 3, each Cartesian source array element 32 is divided into $2^{2n}$ subelements 38, or subpixels, where n is an integer 0,1,2,3, ... representing the resolution of the transformation. This step corresponds to reference numeral 154 in the flow diagram of FIG. 13. In the example illustrated in FIG. 3, the resolution n is set equal to one, and therefore each source array element 32 is divided into $2^{2*1}$, or four subelements 38. Dividing into subelements improves the resolution of the transformation, as a smaller Cartesian grid more closely approximates the contours of the object being imaged and the geometry of the polar system. Each subpixel 38 represents a resolution unit which is indivisible during the transformation.

For purposes of the present invention, a resolution n of zero corresponds to a subdivision of each Cartesian element 32 into one Cartesian subelement 38, since $2^{2*0}$ is equal to one. In this latter example, the subelement 38 is thus defined as the corresponding Cartesian element 32.

Figure 4:
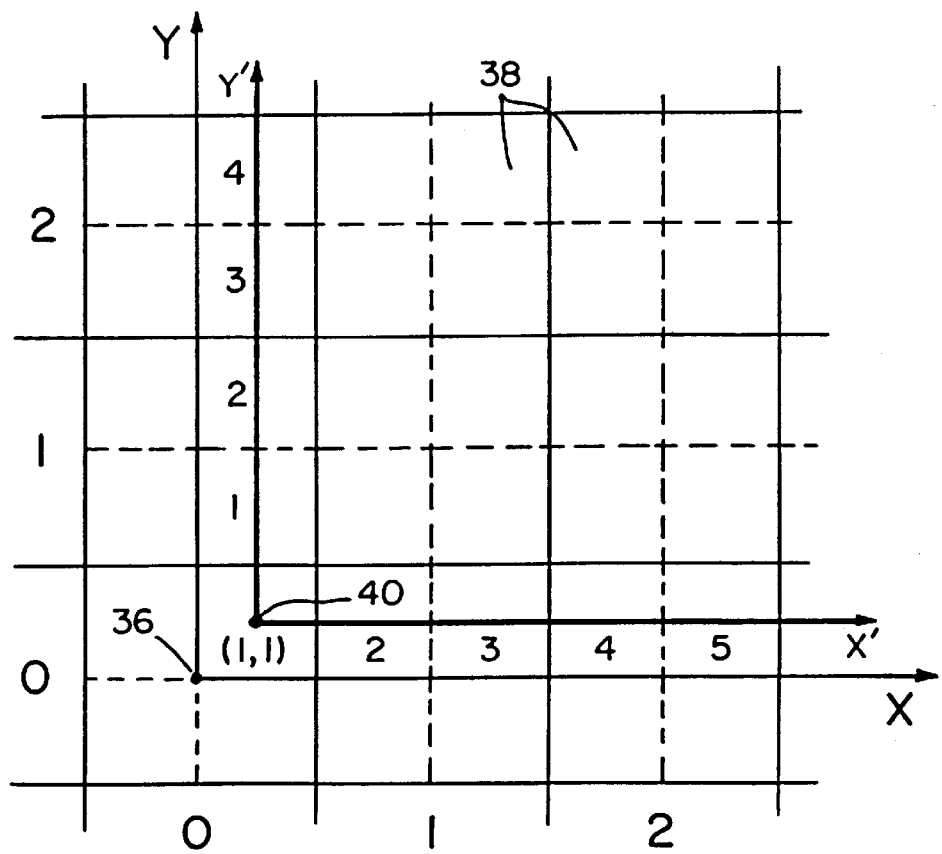
FIG. 4 illustrates the step of designating a new origin and a subelement coordinate system for the Cartesian array of subelements in accordance with the present invention.

The coordinates of the subpixels 38 are represented in terms of a Cartesian subelement system along subelement axes X', Y' as shown in FIG. 4. As described hereinafter, each coordinate point, including the origin, is preferably, but not necessarily, located at the center of the corresponding subpixel. In accordance with step 156 of the FIG. 13 flow diagram, the origin 40 of the subelement system is set at the center of the subelement designated as $(2^{n-1}, 2^{n-1})$; for example, assuming a transformation resolution n of one, the origin of the subelement system would be set at subelement coordinates $(2^0, 2^0)$ or $(1,1)$. This allows for efficient conversion between coordinates in the Cartesian source and subelement systems, as the relationship between systems is a multiplication/division of a factor of $2^n$, a computationally-efficient operation in a binary system. Conversion between system coordinates is performed at a later stage of the transformation when the grey values are computed for each polar element, described in detail below.

A preferred relationship between the source coordinate system (X, Y) and the subelement coordinate system (X', Y') is as follows:

$$X'=2^nX+2^{n-1}; \text{ and} \quad (1)$$

$$Y'=2^nY+2^{n-1}; \quad (2)$$

where n represents the resolution of the subelement system as described above. Additional coordinate system relationships are possible; however the above relationship is preferred as the two coordinate systems are related by the computationally convenient factor of 2.

Figure 5:
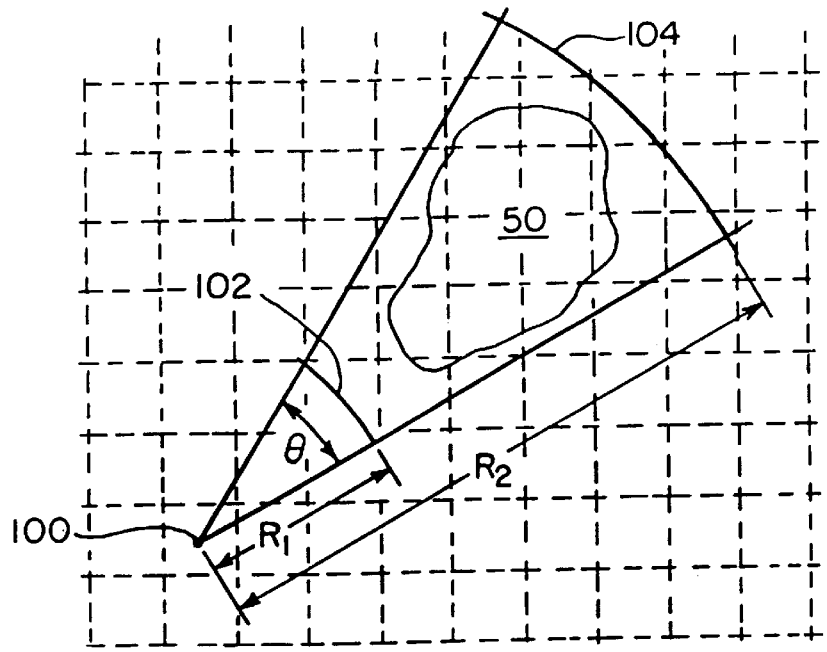
FIG. 5 is an illustration of predetermined spatial parameters for the polar system, including origin location, inner radius, outer radius, and scan angle relative to the imaged object in accordance with the present invention.
Figure 6:
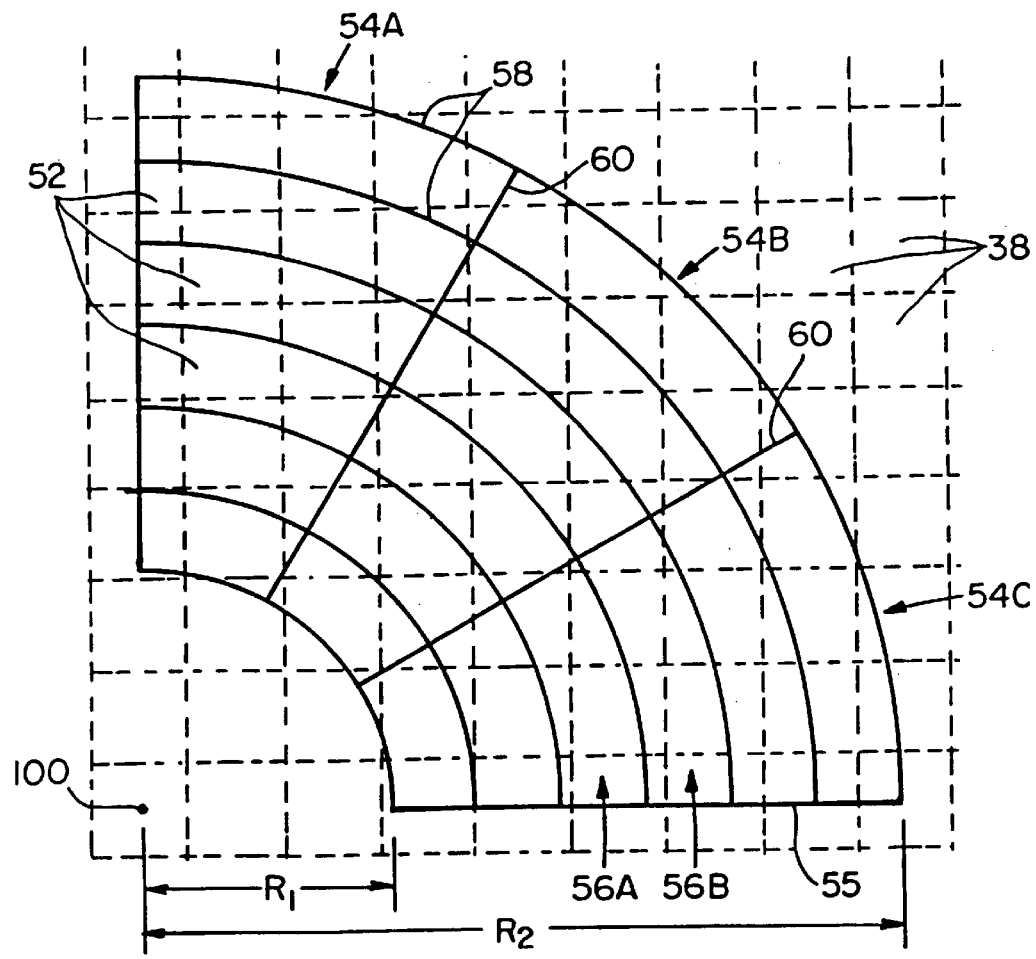
FIG. 6 is an illustration of a designated polar system mapped against the subelement system in accordance with the present invention.

In the next step of the transformation, a polar coordinate system is defined as illustrated in FIGS. 5 and 6, corresponding to step 158 of FIG. 13. The polar system is determined by a plurality of parameters, including origin location 100, inner radius $R_1$, outer radius $R_2$, scan angle θ (including start angle and ending angle), radial resolution, and angular resolution. The inner and outer radii $R_1$, $R_2$ define polar system arcs 102, 104 respectively. The radial resolution parameter defines the number of polar rows 56A, 56B of elements 52 in the polar system, while the angular resolution defines the number of polar columns 54A–C, as shown in FIG. 6. Parameters are selected which are appropriate for imaging the interesting features of the object 50. The system parameters may be determined automatically by the data processing system, or manually by a human operator. The present invention adapts to changes in system parameters in real-time, because the transform relationship is recalculated as each new collection of source data is processed. This is unlike prior art systems which rely on system parameters for creating a predefined fixed map of the relationship between the Cartesian and polar systems, the map remaining fixed for processing each new set of source data.

As a result of defining the polar system geometry, a plurality of polar elements 52 are designated as shown in FIG. 6, arranged in polar columns 54A, 54B, 54C and polar rows 56A, 56B. The polar rows 56 are indexed by the polar coordinate R representing the radial distance of the polar row 56 from the origin; and the polar columns 54 represent the polar angle θ of the column 54B relative to a starting sector line. Assuming a counterclockwise system, the starting sector line for the system of FIG. 6 would be the line 55 along the X axis. The polar rows 56 are arcuate in shape, and the polar columns 54B taper outwardly as the distance from the origin 100 increases. The number of polar rows 56 and polar columns 54 are determined by system radial resolution and angular resolution parameters, as described above.

Each polar element 52 represents a bin or collection of corresponding subelements 38 of the Cartesian subelement system. The resulting arcuate polar bins, also indicated by reference numeral 52, are bound by a plurality of arcs 58 concentric about the origin 100 and a plurality of radial sector lines 60 directed radially outward from the origin 100. The arcs 58 and sector lines 60 are formed of a series of Cartesian subelements 38, as will be described below.

Figure 7:
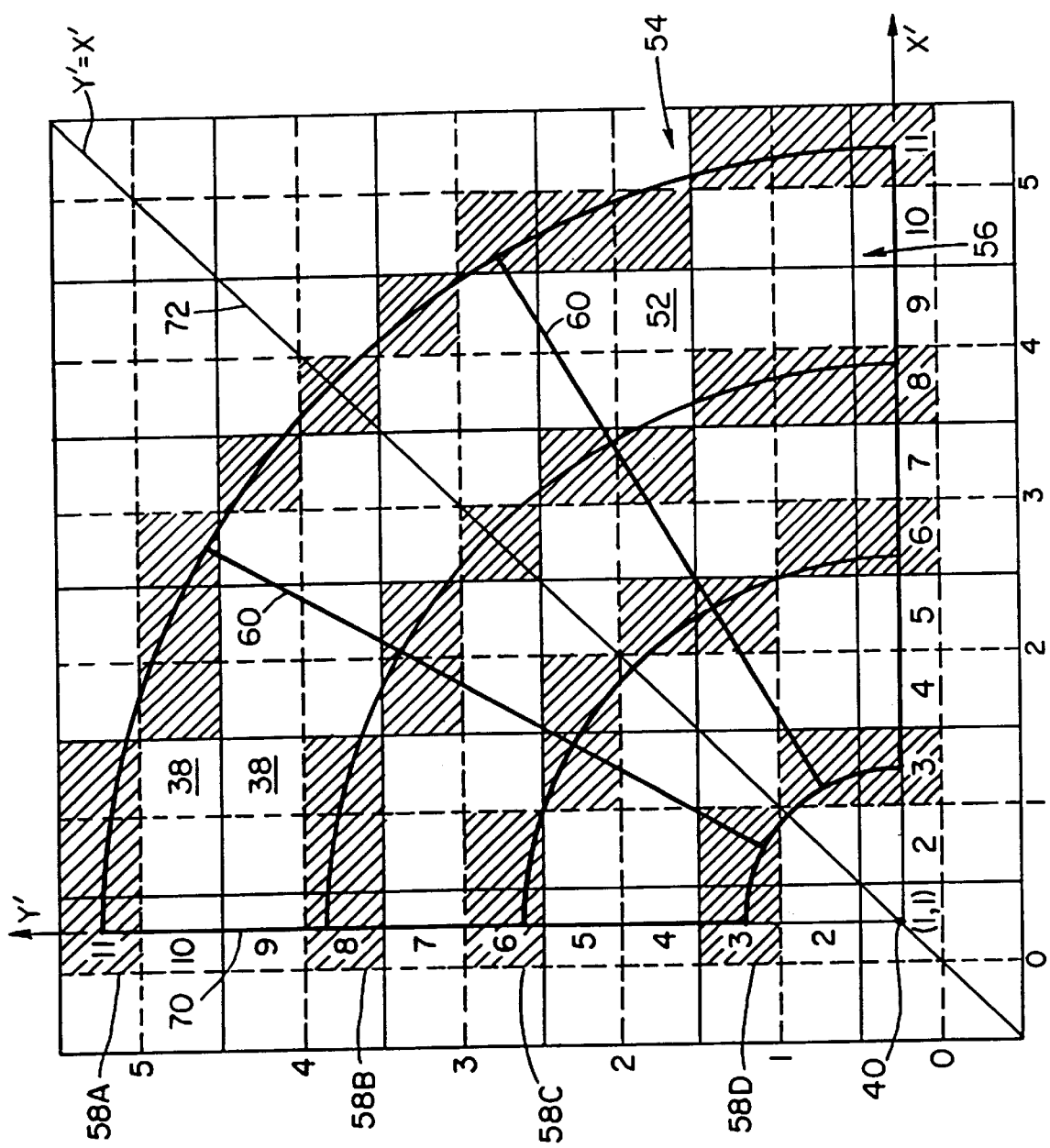
FIG. 7 illustrates the step of defining polar system arcs from the subelements in accordance with the present invention.

In the next step of the transformation, the polar arcs 58 are computed as a series of Cartesian subelements 38, as shown in FIG. 7, where the shaded subelements 38 represent subelements which form the various arcs 58A–D. The coordinates of subelements 38 which lie on the computed arcs 58 are stored in memory for later reference. In a preferred embodiment, a Midpoint Circle Algorithm as described in Foley et al., "Computer Graphics", Addison Wesley, 1992, incorporated herein by reference, is employed to determine the subelements 38 defining each arc. An advantage of the Midpoint Circle Algorithm is that it does not require any floating point calculations or integer multiplications, and therefore is computationally efficient. Other well-known arc generation techniques are also applicable to this step of the invention.

In the example of FIG. 7, for purposes of illustration, the parameters of the polar system are set as follows; minimum radius of 1, maximum radius of 5, starting angle 0 degrees (the X' axis), ending angle 90 degrees (the Y' axis), assuming a counterclockwise positive system, and a polar system resolution parameter n of 1. The origin subelement 40 is set at coordinates $(2^{n-1}, 2^{n-1})$ or $(1, 1)$ in subelement space. The resulting polar system matrix, defined about the origin 40, includes three rows 56 and three columns 54 of polar elements 52. Each polar element or bin 52 in the polar system comprises a plurality of subelements 38 which overlap, or otherwise lie within the boundaries of the polar elements.

In a preferred embodiment, the arc 58 locations are computed in a symmetrical segment of the polar system, for example the second octant. In this example, each octant is defined as a 45° segment, beginning at the X' axis, and extending 45° counterclockwise about the origin 40. For purposes of the present invention, this segment for which are locations are computed shall be referred to herein as the "working segment". This technique takes advantage of the symmetrical nature of the polar system, that is, the curvature or behavior of each arc is identical in all symmetrical segments. This reduces the number of calculations, as the arcs are computed for only a single segment, the working segment, and not over the entire polar system. An octant segment is preferred because mapping of subelement data from other octants requires merely a change in X' and Y' subcoordinates and/or a reversal of the sign of the coordinates, both computationally efficient operations. This operation is described in further detail below in conjunction with FIG. 10, and corresponds with steps 160 and 162 of the FIG. 13 flow diagram.

For the example of FIG. 7, if the second octant relative to the X' and Y' subelement system axes is chosen as the working segment, then subelement arcs 58 are computed between sector line 70 X'=1, representing the Y' subelement system axis, and octant line 72 representing Y'=X' in subelement space. This process corresponds to step 164 in the flow diagram of FIG. 13. Using the well-known Midpoint Circle Algorithm cited above, the following subelement coordinates define the arcs of the FIG. 7 example, shown as arcs 58A, 58B, 58C, 58D respectively of shaded subelements 38:

arc 58A: { (1,11), (2,11), (3,11), (4,10), (5,10), (6,10), (7,9), (8,8) } arc 58B: { (1,8), (2,8), (3,8), (4,7), (5,7), (6,6) } arc 58C: { (1,6), (2,6), (3,5), (4,5) } arc 58D: { (1,3), (2,3) }

The coordinates of the computed arcs of subelements are preferably stored in memory in an efficient manner which allows for expedient access at later stages of the transformation; for example the coordinates may be stored as an array of X' coordinates indexed by an array of pointers which point to the Y' coordinate of the beginning of each arc. In an alternative embodiment, the arcs 58 may be computed over a larger portion of the defined polar system, for example a quadrant, or over the entire defined polar system, at the expense of additional computations.

Figure 8:
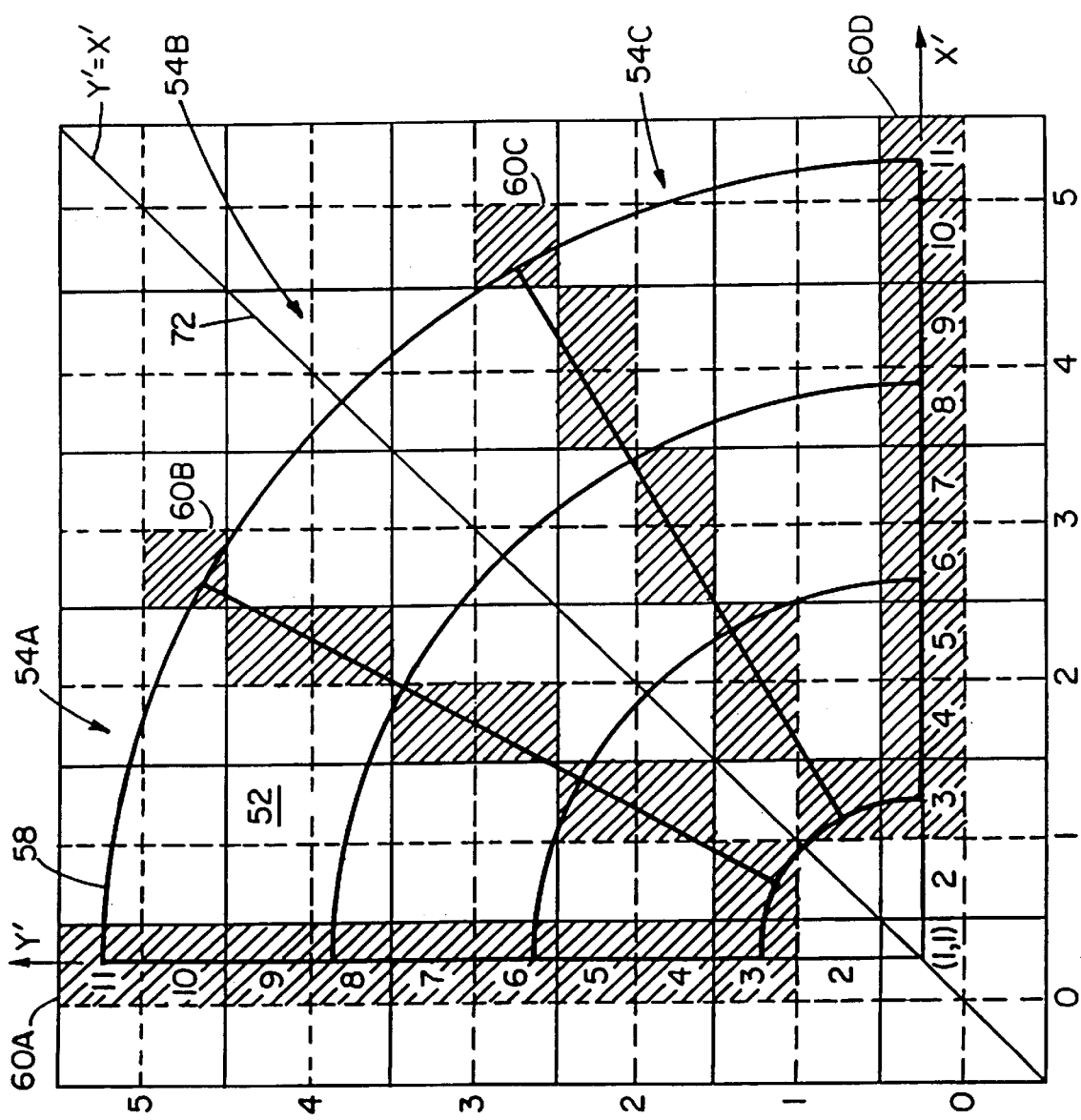
FIG. 8 illustrates the step of defining polar system sector lines from the subelements in accordance with the present invention.

In the next step of the transformation, with reference to FIG. 8, sector lines 60A, 60B, 60C, 60D are computed. This process corresponds to step 173 of FIG. 13. The sector lines 60 extend radially outward from the origin 40 and perpendicularly intersect the arcs 58 of FIG. 7. The sector lines 60 define the side boundaries of the polar elements 52, and arrange the elements 52 into polar columns 54. The number of sector lines 60 and their respective locations depend upon the geometry of the designated polar system (starting angle, ending angle) and the angular resolution thereof In a preferred embodiment, the Midpoint Line Algorithm is employed, as described in Foley et al., cited above, for determining those subelements which define the sector lines. This technique calculates the sector lines using the starting point $(X_1', Y_1')$ and ending point $(X_2', Y_2')$ of each sector line as its arguments;

$$X_1' = R_1 * \cos(\theta) \quad Y_1' = R_1 * \sin(\theta) \tag{3}$$

$$X_2' = R_2 * \cos(\theta) \quad Y_2' = R_2 * \sin(\theta) \tag{4}$$

where $R_1$ and $R_2$ represent the inner and outer radii of the polar system respectively, as determined by the polar system parameters, and where $\theta$ represents the polar angle of the sector line relative to the polar system axis, in this example, the X' axis. Although these computations involve floating point arithmetic, they are performed only once per sector line for determining the side boundaries of each polar element, in a less iterative segment of the transformation.

The calculated sector lines 60 define the boundaries of each polar column 54 in the polar system. The coordinates of the subelements 38 corresponding to the sector lines 60 defining each column are stored in memory in a manner similar to the arc coordinates as described above. For the given example of FIG. 8, the following subelement system coordinates (X',Y') define the sector lines:

line 60A: { (1,3), (1,4), (1,5), (1,6), (1,7), (1,8), (1,9), (1,10), (1,11) } line 60B: { (2,3), (3,4), (3,5), (4,6), (4,7), (5,8), (5,9), (6,10) } line 60C: { (3,2), (4,3), (5,3), (6,4), (7,4), (8,5), (9,5), (10,6) } line 60D { (3,1), (4,1), (5,1), (6,1), (7,1), (8,1), (9,1), (10,1), (11,1) }

Note that line 60C and line 60B are symmetric about the octant line 72, as are lines 60A and 60D. The symmetry is represented by the juxtaposition of the X' and Y' coordinates for each respective element, and will allow for certain computational advantages described below. Note also that each of the inner sector lines 60B, 60C are shared by adjacent columns; for example sector line 60B is shared by polar columns 54A and 54B, and sector line 60C is shared by columns 54B and 54C. A preferred embodiment of the present invention recognizes and takes advantage of this feature so that sector lines shared by adjacent columns are computed only once during a transformation, improving system efficiency. Furthermore, in a preferred embodiment, the sector lines 60A–60D are not all calculated initially, instead, they are computed individually on a column-by-column basis, conferring certain additional computational advantages, for example, simplifying computer access to the locations of the sector line subelements.

As the sector lines 60A–60D of each column 54A–54C are computed, the intersection points between the lines 60A–60D and the polar arcs 58A–58D (see FIG. 7) are likewise stored. The stored intersection points, in other words, the subelement locations which are shared by the arcs and sector lines, provide information related to the geometry of the defined polar element, and its extent along the X' and Y' axes. This is useful at a later stage of the transformation, when each polar element data value is computed as a function of its respective contributing subelements.

The stored coordinates of the sector lines 60 in combination with the stored coordinates of the arcs 58 form boundaries of polar elements 52, or polar bins, corresponding to the polar coordinate system. The resulting data values for the polar elements 52 are calculated as a function of the subelements which fall within the boundaries of each polar bin.

Following determination of the polar bin arc 58 (see FIG. 7) and sector line 60 (see FIG. 8) boundaries, the data values for each of the polar elements 52 are computed as a function of each of the Cartesian system subelements which overlap or otherwise fall within the boundaries of the polar element. Note that in a preferred embodiment, the subelements 38 themselves are not assigned data values; instead the coordinates of each subelement within a polar bin 52 are converted back to their corresponding source element coordinates, which are in turn used to access the corresponding data values. In other words, the subelements represent fractional portions of the source elements from which they were derived. An example of this coordinate system conversion is illustrated below with reference to FIGS. 9A and 9B.

In a preferred embodiment, each Cartesian subelement 38 is designated to only a single polar element 52, so those subelements 38 which lie on a sector line 60 or arc 58 shared by two polar elements are designated to either, but not both, of the two bordering polar elements. For example, in a preferred embodiment, assuming a counter-clockwise polar system, the Cartesian subelements forming the outermost arc and the furthest counterclockwise sector line of each polar element 52 are designated as Cartesian subelements contributing to the calculation of the polar element 52 data value, while the innermost arc and the furthest clockwise sector line do not. Other formulations are possible and applicable to the present invention.

Figure 9B:
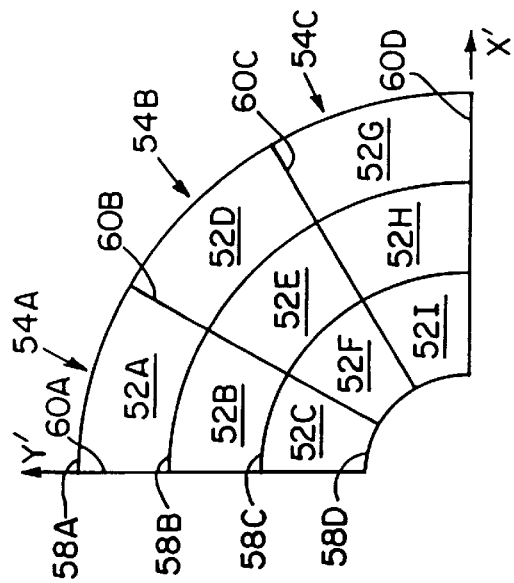
FIG. 9B illustrates the polar system arcs, sector lines and elements in accordance with the present invention.
Figure 9A:
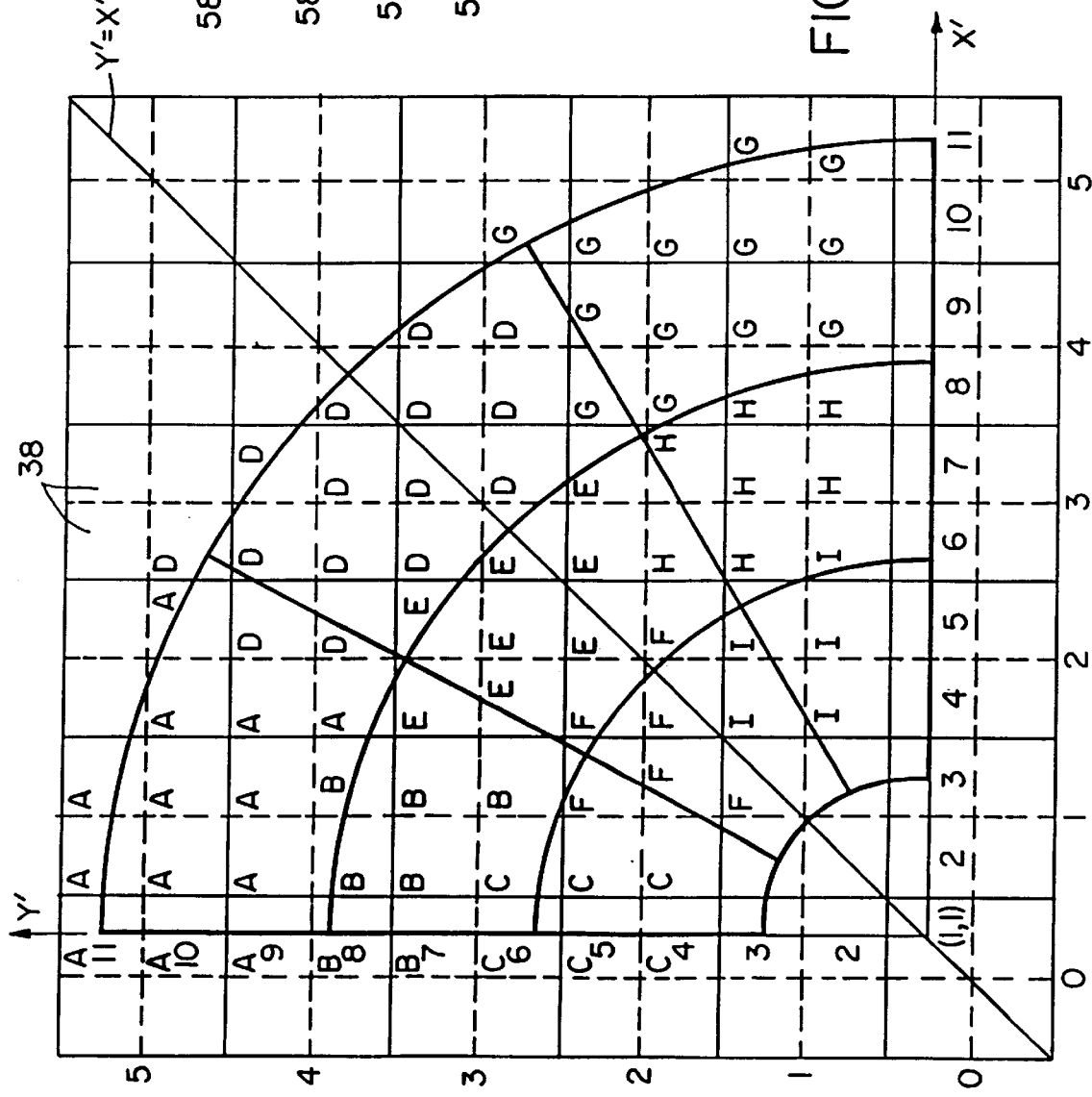
FIG. 9A illustrates the appointment of subelements to polar elements in accordance with the present invention.

Referring to the illustrative example of FIGS. 9A and 9B, the sets of Cartesian subelements labeled A . . . I in FIG. 9A are designated to polar elements 52A . . . 52I respectively of FIG. 9B. Each polar element 52 includes any Cartesian subelements 38 lying within the arc 58 and line 60 boundaries. Those subelements which lie along an outermost arc boundary 58A . . . D or along the furthest clockwise sector line 60A . . . D are included in the polar element Those Cartesian subelements which lie along an inner arc boundary 58A . . . D or the furthest clockwise sector line boundary 60A . . . D are designated to neighboring polar elements.

Computation of the data values for the polar elements will now be described. In a preferred embodiment, the data values for the polar subelements are computed on a column-by-column basis. For example, the data values for each polar element 52A, 52B, 52C in column 54C are computed, followed by the polar elements corresponding to column 54B (52D, 52E, 52F) and column 54C (52G, 52H, 52I).

Beginning with polar column 54A, the polar system lines and arcs defining polar elements 52A, 52B, and 52C are calculated and the Cartesian subelements are designated to polar elements or bins 52A, 52B, 52C as described above. The data values, for example the grey scale values, of each polar element in the destination array are derived from the data value of each Cartesian element in the source array.

In a preferred embodiment, the corresponding data values are computed for each row of Cartesian subelements within a polar bin, starting with the outermost and furthest counterclockwise subelement, for example subelement (1,11) in polar element 52A, and continuing row-by-row to the innermost and furthest clockwise subelement, for example subelement (4,8). The steps for calculating the data value for polar element 52A are as follows:

1. Determine the Cartesian subelements which contribute to, or otherwise lie within the boundaries of the polar element. This step corresponds with reference to step 174 of FIG. 13. For polar element 52A, the following subelements contribute:
{ (1,11), (2,11), (3,11), (1,10), (2,10), (3,10), (4,10), (5,10), (1,9), (2,9), (3,9), (4,9), (4,8) }

This step is preferably performed with the benefit of the previously-stored intersection points which provide information related to the extent of the polar bin along the X' and Y' subelement axes. In this example, the polar bin 52A ranges from subelement row Y'=8 to subelement row Y'=11. For each row, the arcs and sector lines determine the start and ending coordinates along the X' axis. In this manner, the prestored arc, sector line, and intersection point information is employed to generate efficient iterative loop operations which scan the subelements contributing to the polar elements on a row-by-row (indexed by Y') and a column-by-column (indexed by X') basis. It will be readily apparent to one skilled in the art of computer programming as to how such iterative loop operations can be configured in an efficient manner to perform these calculations.

2. Convert the Cartesian subelement coordinates to their original Cartesian source array element coordinates. (step 176 of FIG. 13) For example, the subelement coordinates of polar element 52A:
{ (1,11), (2,11), (3,11), (1,10), (2,10), (3,10), (4,10), (5,10), (1,9), (2,9), (3,9), (4,9), (4,8)};
convert to the following original source array element coordinates:
{ (0,5), (1,5), (1,5), (0,5), (1,5), (1,5), (2,5), (2,5), (0,4), (1,4), (1,4), (2,4), (2,4) }
In a preferred embodiment where the source array element and subelement coordinate systems are related according to Equations 1 and 2 above, this coordinate conversion step requires merely a right shift of n bits for each X' and Y' coordinate, where n represents the resolution of the transformation, an efficient calculation in a binary data processing system. In the present example, the resolution n is set equal to one, as described above. Therefore, if the subelement and element coordinates are formatted as binary integers, the conversion requires a shift to the right of one bit, an efficient equivalent of dividing the integer coordinate by two.

3. Determine and sum the data values for each polar subelement In this step the data values are accessed for each of the original source array element coordinates (step 178 of FIG. 13) and their respective values are summed (step 182 of FIG. 13). The source array was initially stored in memory and its data values are preferably addressable by the element coordinates.

For example, assume that the following elements of the source array corresponded to the following integer grey values:
(0,5)—40 (1,5)—50 (2,5)—60
(0,4)—70 (1,4)—80 (2,4)—90
The source array element coordinates corresponding to the subelement coordinates—
{ (0,5), (1,5), (1,5), (0,5), (1,5), (1,5), (2,5), (2,5), (0,4), (1,4), (1,4), (2,4), (2,4) }.
would be summed as follows
40+50+50+40+50+50+60+60+70+80+80+90+90=810.

4. Normalize the data value for the polar element (step 184 of FIG. 13). For normalization, the sum of the subelement data values is divided by the number of subelements contributing to the polar element. In the efficient embodiment of the present invention, the division operation required for normalization is performed only once per polar element.

For example, if the sum of the subelement data values is 810 and the number of subelements in polar element 52A is 13, then $$810/13 = 62.$$

The grey value assigned to polar element 52A is 62.

Note that although the above example resolves data values for the subelements in a polar bin 52 as a group, it can be more computationally efficient to perform the steps listed above on a subelement-by-subelement basis. For example, each subelement can individually be assigned to a polar bin 52, converted to the corresponding source element coordinates, and its data value retrieved. The data value can be stored in an accumulator, and grouped with data values of other subelements in the bin, and normalized. Both orders of calculation are applicable to the present invention, and each offers certain advantages with regard to efficiency and complexity.

To improve the efficiency of the transformation, certain features of the polar system can be exploited to minimize the number of calculations and to maximize system throughput. As an example, determination of the subelements contributing to the radial sector lines 60 involves floating point computations (Equations 3 and 4); burdensome computations in some systems. By recognizing that some sector lines are shared by adjacent columns, for example sector line 60B is shared by columns 54A and 54B and sector line 60C is shared by columns 54B and 54C, the lines can be computed only once, and their coordinates stored for use in polar element computations on each side of the shared sector line 60.

Figure 10:
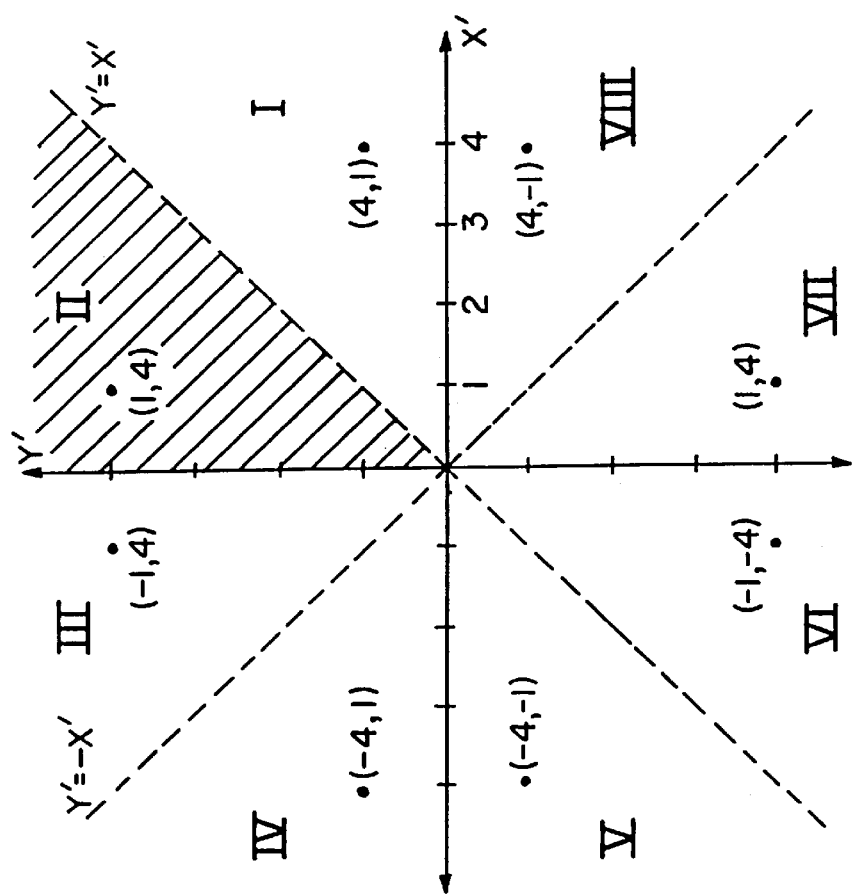
FIG. 10 is a chart depicting the division of the polar system into octants and mapping of elements between octants across lines of symmetry in accordance with the present invention.

In another example of a technique for improving efficiency, the polar system is divided into symmetrical segments, for example octants, about the polar system origin (1,1), taking advantage of the fact that the geometry of the computed arcs are symmetrical in all octants. This feature is illustrated as step 160 of FIG. 13. In this embodiment, the arcs are calculated in only one of the symmetrical segments;

a designated working segment (step 162 of FIG. 13), to reduce the number of calculations. When computing data values for subelements in the remaining octants, their respective coordinates are mapped to the computed octant FIG. 10 is an illustration of a Cartesian coordinate system divided into symmetrical segments, for example octants I–VIII. Assuming that the designated working segment is octant II, subelements from any remaining octants are mapped into octant II to determine the polar element to which they are designated. An octant serves as a computationally efficient and convenient symmetrical segment because all subelements designated by Cartesian coordinates can readily be mapped between octants by either transposing the subelement's X' and Y' coordinates, or by reversing the sign of the X' and Y' coordinates, or both. For example, mapping a subelement designated by coordinates (4,1) from octant I to its corresponding location in octant II involves transposing the X' and Y' coordinates; subelement (4,1) in octant I would map to subelement (1,4) in octant II. Likewise, subelement (−1,4) in octant m would map to subelement (1,4) in octant II, by reversing the sign of the X' coordinate. The following are general rules which can be applied to mapping subelements between octants:

1. If the octants are symmetrical about the X' axis (for example octants I and VIII, II and VII, III and VI, and IV and V), the sign of the Y' coordinate is reversed.

2. If the octants are symmetrical about the Y' axis (for example octants II and III, I and IV, VIII and V, and VII and VI), the sign of the X' coordinate is reversed.

3. If the octants are symmetrical about the Y'=X' octant line (for example octants I and II, VIII and III, VII and IV, VI and V), then the X' and Y' coordinates are transposed.

4. If the octants are symmetrical about the Y'=X' octant line (for example octants III and IV, II and V, I and VI, VIII and VII), then the X' and Y' coordinates are transposed and the signs of both coordinates reversed.

Figure 11:
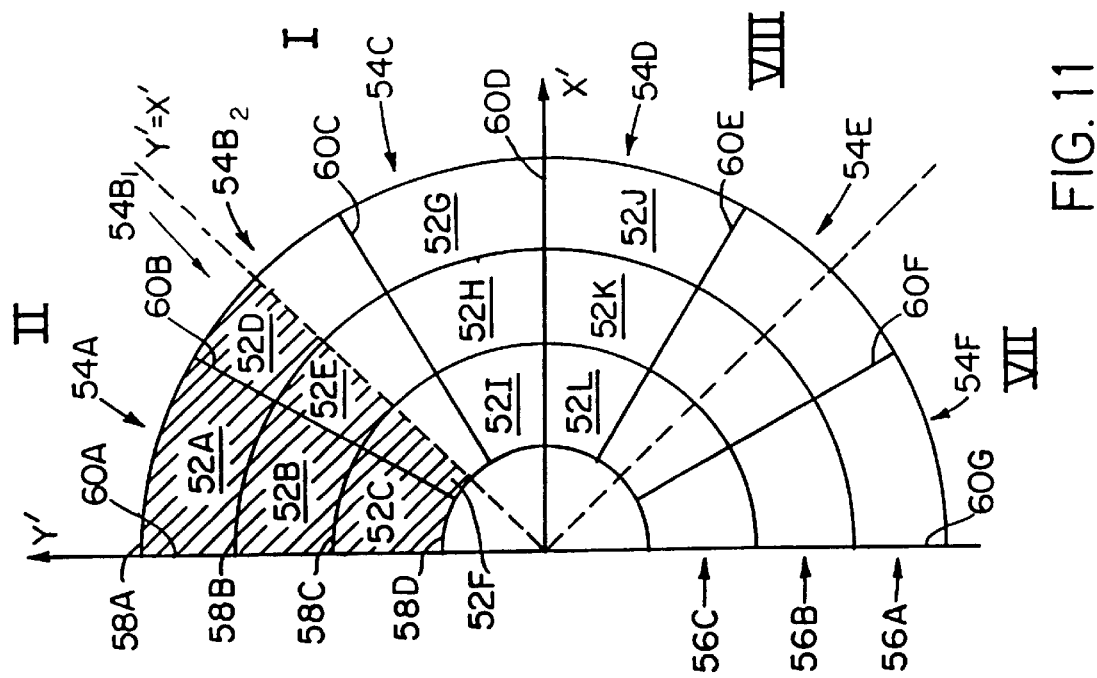
FIG. 11 is a chart illustrating designation of a working segment and the mapping of polar columns to the working segment in accordance with an efficient embodiment of the present invention.

With reference to FIG. 11, assuming that octant II is the working segment of the polar system, the polar arcs 58A–58D are computed between octant lines X'=0, along the Y' axis, and Y'=X', the line which divides octant I and octant II (step 164 of FIG. 13). Assuming that the polar elements of column 54A are to be computed first, sector lines 60A, 60B are computed and their points of intersection with arcs 58A–58D are stored. The respective values for the polar elements in column 54A are calculated as described above.

Column 54B is bisected into column portions 54B₁, and 54B₂ by octant line Y'=X'. Therefore, the arcs 58A–D for column 54B have been computed in only column portion 54B₁. Computation of this bisected column is divided into two steps. First, the value of the subelements contributing to portion 54B₁ between sector line 60B and octant line Y'=X' are calculated. Following this, sector line 60C is mapped from octant I to octant II according to the rules outlined above for mapping between octants. The sector line 60C is computed in working octant II, and as the line is computed, its intersection points with arcs 58A–58D are stored as described above. Following this, the subelements contributing to each polar element bounded by mapped line 60C and the Y'=X' octant line are stored. For determining the data values for any subelements which are mapped to a working segment, the coordinates of the subelements are first mapped back into the originating octant, octant I in this example, and their respective data values are determined as described above. The respective subelement value from the two portions 54B₁, 54B₂ of the polar elements are accumulated and normalized for each polar element, as described above.

Computation of polar column 54C likewise involves mapping and computing lines 60C and 60D into the working octant II, storing their respective intersection points with arc 54A–54D and determining the subelements which contribute to the polar elements bounded by the intersecting arcs and mapped sector lines. For computing the data values of the mapped subelements, the coordinates of the subelements are first mapped back into the octant from which they came, octant I, and their data values calculated as described above.

Figure 12:
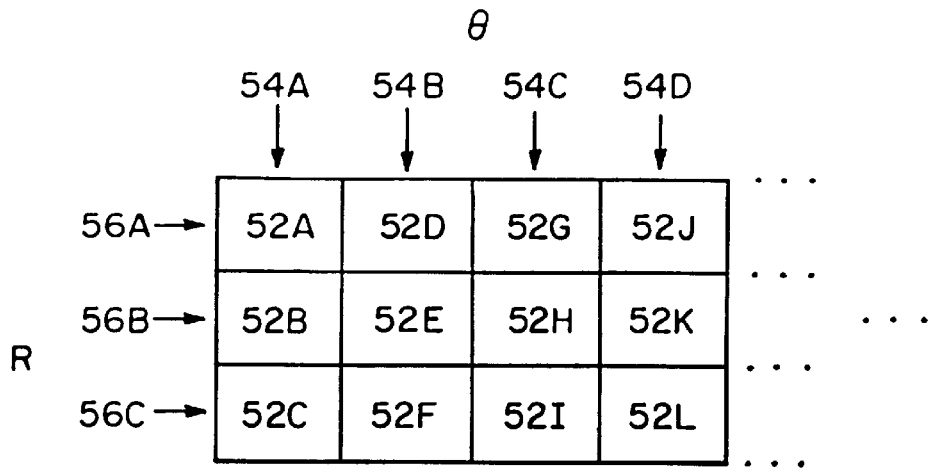
FIG. 12 is a chart of the resulting two-dimensional destination array of data elements in accordance with the present invention.

This process continues for remaining columns 54D–54F until the data values for all polar elements in the polar system are computed. The resulting two-dimensional destination data array is illustrated in FIG. 12 indexed by radius R along polar rows 56A–56C and by angle θ along polar columns 54A–54D. The destination array is preferably stored in memory for retrieval by the imaging system.

Figure 14:
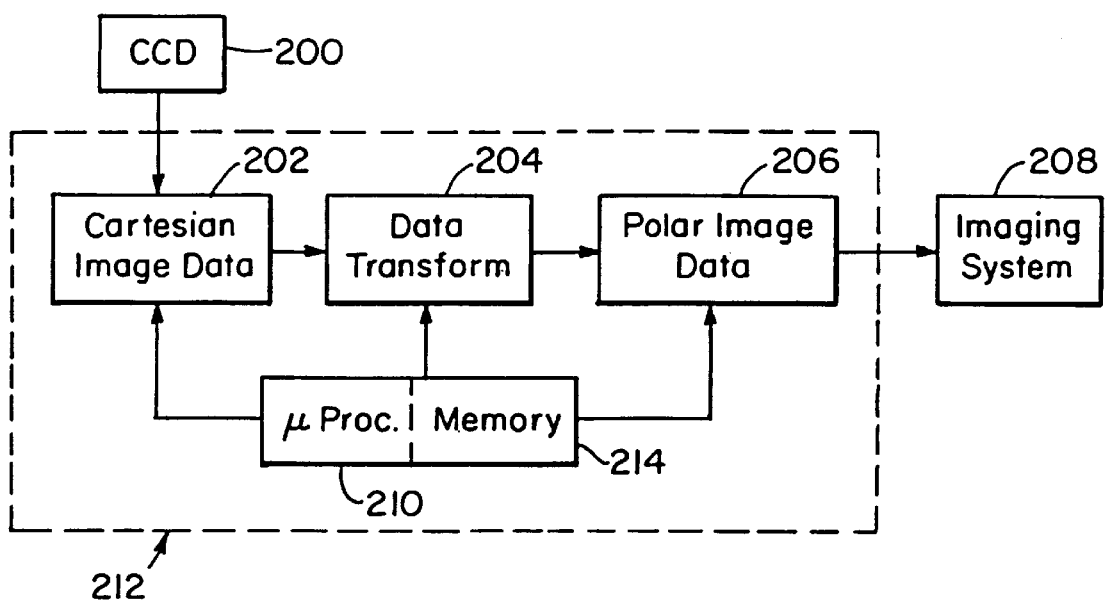
FIG. 14 is a block diagram of a preferred system for performing the transformation of the present invention.

With reference to FIG. 14, in a preferred embodiment, the image processing system of the present invention comprises an input, for example a CCD array 200, for receiving the source image data 202, and a processing subsystem 212. The subsystem 212 includes a data processor 210 and memory 214, the processor 210 operating under control of a program stored in memory 214 to carry out the steps described above. The Cartesian source image data 202 is transformed by data transform 204 to polar image data 206, which is stored in memory 214 and made available to the imaging system 208.

The transformation of the present invention offers a drastic reduction of the number of computationally expensive floating point calculations performed per data batch. Any necessary floating point calculations are performed in the less-iterative segments of the transform, for example one division calculation per polar element necessary for normalization, and a limited number of sine operations and multiplications per polar column. The highly-iterative functions pertaining to the designation and accumulation of subelements contributing to polar element data values employ efficient integer operations. Furthermore, a speed advantage is realized by dividing the polar system into symmetrical segments and computing the arcs in only a designated working segment.

The transformation of the present invention offers the advantages of computational efficiency through a reduction of complex floating point calculations, increased flexibility, and real-time adaptability to changes in system parameters.

While this invention has been particularly shown and described with references to preferred embodiments thereof, it will be understood by those skilled in the art that various changes in form and details may be made therein without departing from the spirit and scope of the invention as defined by the appended claims.

I claim:

1. A method for converting a Cartesian system of discrete data elements to a polar system of discrete data elements, each Cartesian element having a corresponding data value, comprising:

dividing each Cartesian element into subelements;

designating one of the subelements as a polar system origin;

defining a polar system about said origin comprising an intersecting plurality of radial sector lines and a plurality of confocal arcs formed of said subelements, said sector lines and arcs defining boundaries of polar elements;

for each subelement within the boundaries of a polar element, determining a subelement data value derived from the data value of the Cartesian element from which the subelement was divided; and calculating a data value for each polar element based on the data values of the subelements within the boundaries of the polar element.

2. The method of claim 1 wherein dividing comprises dividing each element into $2^{2n}$ subelements, where n represents subelement resolution.

3. The method of claim 2 where n is a positive integer selected from the set of positive integers consisting of { 0, 1, 2, 3, . . . }.

4. The method of claim 1 wherein dividing comprises dividing the Cartesian elements into $2^{2n}$ Cartesian subelements, and wherein designating a polar system origin comprises designating a Cartesian element having coordinates $(2^{n-}, 2^{n-1})$ in subelement space as the polar system origin.

5. The method of claim 1 wherein each polar element is defined by inner and outer arc boundaries and first and second sector line boundaries, and wherein the subelements within the boundaries of the polar element include the subelements corresponding to one of the inner and outer arc boundaries and one of the first and second sector line boundaries.

6. The method of claim 5 wherein the subelements within the boundaries of the polar element correspond to the outer arc and the furthest counter-clockwise sector line.

7. The method of claim 1 wherein determining a subelement data value for each subelement within the boundaries of each polar element comprises:

converting the Cartesian coordinates of each subelement to the coordinates of the element from which the subelement was divided; and determining the data value of the element.

8. The method of claim 1 further comprising:

dividing the polar system into symmetrical radial segments;

designating one of the polar system segments as a working segment; and defining the polar system arcs in the working segment.

9. The method of claim 8, further comprising:

mapping each sector line not within the working segment from an original segment into the working segment, said arcs and mapped sector lines defining boundaries of a mapped polar element;

for each subelement within the boundaries of a mapped polar element, mapping the subelements to the original segment and determining a subelement data value derived from the data value of the Cartesian element in the original segment from which the subelement was divided.

10. The method of claim 8 wherein the symmetrical radial segments comprise octants.

11. The method of claim 1 further comprising determining the number of sector lines and polar arcs from the resolution of the polar system.

12. The method of claim 1 wherein the elements comprise image pixels.

13. An image-processing system for converting a Cartesian system of discrete data elements to a polar system of discrete data elements comprising:

an input that receives a source array of discrete data elements indexed by Cartesian coordinates, each Cartesian element having a corresponding data value; and a processing subsystem comprising a processor and a memory, the processor operating under the control of a program stored in the memory to:

divide each Cartesian element into subelements, each subelement indexed by its own Cartesian coordinates;

designate one of the subelements as a polar system origin;

define a polar system about said origin including an intersecting plurality of radial sector lines and a plurality of confocal arcs formed of said subelements, said sector lines and arcs defining boundaries of polar elements;

for each subelement within the boundaries of a polar element, determine a subelement data value derived from the data value of the Cartesian element from which the subelement was divided;

calculate a data value for each polar element based on the data values of the subelements within the boundaries of the polar element; and store each polar element data value in memory.

14. The system of claim 13 wherein the processing subsystem further divides each element into $2^{2n}$ subelements, where n represents the resolution of the conversion.

15. The system of claim 14 where n is a positive integer selected from the set of positive integers consisting of {0, 1, 2, 3, . . . }.

16. The system of claim 13 wherein the Cartesian elements are divided into $2^n$ Cartesian subelements and wherein the processing subsystem further designates a Cartesian element having coordinates $(2^{n-1}, 2^{n-1})$ in subelement space as the polar system origin.

17. The system of claim 13 wherein each polar element is defined by inner and outer arc boundaries and first and second sector line boundaries, and wherein the subelements within the boundaries of the polar element include the subelements corresponding to one of the inner and outer arc boundaries and one of the first and second sector line boundaries.

18. The system of claim 17 wherein the subelements within the boundaries of the polar element correspond to the outer arc and the furthest counter-clockwise sector line.

19. The system of claim 13 wherein the processing subsystem determines a subelement data value for each subelement within the boundaries of each polar element by:

converting the Cartesian coordinates of each subelement to the coordinates of the element from which the subelement was divided; and determining the data value of the element.

20. The system of claim 13 wherein the processing subsystem further:

divides the polar system into symmetrical radial segments;

designates one of the polar system segments as a working segment; and defines the polar system arcs in the working segment.

21. The system of claim 20 wherein the processing subsystem further:

maps each sector line not within the working segment from an original segment into the working segment, said arcs and mapped sector lines defining boundaries of a mapped polar element; and for each subelement within the boundaries of a mapped polar element, maps the subelements to the original segment and determines a subelement data value derived from the data value of the Cartesian element in the original segment from which the subelement was divided.

22. The system of claim 20 wherein the symmetrical radial segments comprise octants.

23. A method for converting a pixel image array arranged as a Cartesian system of discrete data elements to an image array arranged as a polar system of discrete data elements, each Cartesian element having a corresponding data value, comprising:

sensing an image at a sensor comprising an array of pixels;

storing said image in a memory as an array of discrete data elements indexed by Cartesian coordinates;

dividing each Cartesian element into subelements;

designating one of the subelements as a polar system origin;

defining a polar system about said origin comprising an intersecting plurality of radial sector lines and a plurality of confocal arcs formed of said subelements, said sector lines and arcs defining boundaries of polar elements;

for each subelement within the boundaries of a polar element, determining a subelement data value derived from the data value of the Cartesian element from which the subelement was divided;

calculating a data value for each polar element based on the data values of the subelements within the boundaries of the polar element; and storing the polar element data values in memory.

* * * * *

UNITED STATES PATENT AND TRADEMARK OFFICE
CERTIFICATE OF CORRECTION

PATENT NO. : 6,064,388
DATED : May 16, 2000
INVENTOR(S) : Igor Reyzin

It is certified that error appears in the above-indentified patent and that said Letters Patent is hereby corrected as shown below:

Claim 4, column 13, line 14, delete "$2^n$, $2^{n-1}$" and insert therefor --$2^{n-1}$, $2^{n-1}$ --.

Signed and Sealed this

Tenth Day of April, 2001

*Attest:*

NICHOLAS P. GODICI

*Attesting Officer*  *Acting Director of the United States Patent and Trademark Office*